US010540383B2

(12) United States Patent
Cobbett et al.

(10) Patent No.: US 10,540,383 B2
(45) Date of Patent: Jan. 21, 2020

(54) AUTOMATIC ONTOLOGY GENERATION

(71) Applicant: International Business Machines Corporation, Armonk, NY (US)

(72) Inventors: Michael Cobbett, Hampshire (GB); Jonathan Limburn, Hampshire (GB); Martin Oberhofer, Bondorf (DE); Scott Schumacher, Porter Ranch, CA (US); Olena Woolf, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 15/386,812

(22) Filed: Dec. 21, 2016

(65) Prior Publication Data

US 2018/0173795 A1 Jun. 21, 2018

(51) Int. Cl.
| | | |
|---|---|---|
| *G06F 16/36* | (2019.01) | |
| *G06F 16/31* | (2019.01) | |
| *G06F 16/35* | (2019.01) | |

(52) U.S. Cl.
CPC .......... *G06F 16/367* (2019.01); *G06F 16/316* (2019.01); *G06F 16/355* (2019.01)

(58) Field of Classification Search
CPC ...... G06F 16/367; G06F 16/316; G06F 16/25; G06F 16/355
USPC ........................................................ 707/739
See application file for complete search history.

(56) References Cited

U.S. PATENT DOCUMENTS

| | | | |
|---|---|---|---|
| 7,987,088 B2 | 7/2011 | Moitra et al. | |
| 8,620,964 B2 | 12/2013 | Tsatsou et al. | |
| 2012/0109966 A1* | 5/2012 | Liang ................. | G06F 16/3323 707/740 |

(Continued)

FOREIGN PATENT DOCUMENTS

WO 2013002436 1/2013

OTHER PUBLICATIONS

Bedini et al., "Automatic Ontology Generation: State of the Art", http://bivan.free.fr/Docs/Automatic_Ontology_Generation_State_of_Art.pdf, retrieved from Internet Nov. 2016, 15 pages.

(Continued)

*Primary Examiner* — Evan Aspinwall
(74) *Attorney, Agent, or Firm* — Robert Bunker; Edell, Shapiro & Finnan, LLC

(57) ABSTRACT

An ontology is automatically generated for a set of data from multiple data sources. A semantic network of known concepts serves as an ontology template for a target domain of knowledge with known concepts defined as base entity types. Logical groupings of data and associated technical metadata are read from the data sources. Data discovery techniques are applied to detect semantic and/or syntactic classification of data attributes in the logical groupings of data. For each of the logical groupings of data, an entity type with properties for the data attributes are generated and the generated entity type is added to the semantic network with classifications of the properties as derived from the applied data discovery techniques. Semantic meanings of the generated entity types are generated and associated with other entity types within the semantic network and the semantic network is output as a resultant ontology for the set of data.

21 Claims, 9 Drawing Sheets

(56) References Cited

U.S. PATENT DOCUMENTS

| | | | |
|---|---|---|---|
| 2013/0325770 A1* | 12/2013 | Heidasch | G06N 3/0427 706/20 |
| 2015/0006432 A1 | 1/2015 | Grosset et al. | |
| 2015/0039611 A1 | 2/2015 | Deshpande et al. | |
| 2016/0224645 A1 | 8/2016 | Dang | |
| 2016/0232216 A1 | 8/2016 | Wurzer | |
| 2016/0335544 A1 | 11/2016 | Bretschneider et al. | |

OTHER PUBLICATIONS

Jakjoud et al., "Automatic Generation of Ontology from Data Source Directed by Meta Models", International Journal of Computer, Electrical, Automation, Control and Information Engineering, vol. 8, No. 10, 2014, 6 pages.

Wang et al., "SMDM: Enhancing Enterprise-Wide Master Data Management Using Semantic Web Technologies", VLDB Endowment, Aug. 2009, 4 pages.

Gan et al., "Heterogeneous Information Knowledge Construction Based on Ontology", http://journal.uad.ac.id/index.php/TELKOMNIKA/article/view/4787, TELKOMNIKA, vol. 14, No. 4, ISSN: 1693-6930, Dec. 2016, pp. 1617-1628.

PCT International Search Report and the Written Opinion of the International Search Authority, PCT/EP2017/081861, dated Feb. 23, 2018, 16 pages.

Jeong et al., "Creating Semantic Data from Relational Database", 2013 International Conference on Social Computing, IEEE, Sep. 8, 2013, pp. 1081-1086.

Ashino et al., "Development of Information Platform for Data Exchange between Heterogeneous Material Data Resources", Database Compendex [Online] Engineering Information, Inc., New York, NY, US, 2007, pp. 553-563.

* cited by examiner

FIG. 4

| DATASET S1 "CUSTOMER.CSV" 400 | | | | |
|---|---|---|---|---|
| CUSTOMER_ID | LAST_NAME | FIRST_NAME | DATE_OF_BIRTH | ... |
| 744370286 | JUNYAN | FRED | 1950-05-03 | |
| 667843210 | CARTER | JEROME | 1963-06-09 | |
| 986578947 | BROWN | CATHERINE | 1949-12-03 | |
| ⋮ | | | | |

| DATASET S2 "PROSPECT.CSV" 410 | | | | |
|---|---|---|---|---|
| Given_Name | Surname | Birthdate | Address Line | ... |
| Robert | Jones | 1970-11-16 | 123 Main Street | |
| Ken | Clark | 1963-01-19 | 2 Mountain Road | |
| Susan | Ling | 1969-09-23 | 20 Main Street | |
| ⋮ | | | | |

| REVIEW INTERFACE 420 | | |
|---|---|---|
| COLUMNS | SOURCE | CLASSIFICATION |
| CUSTOMER_ID | S1 | |
| FIRST_NAME | S1 AND S2 | First Name 421 |
| LAST_NAME | S1 AND S2 | Last Name |
| DATE_OF_BIRTH | S1 AND S2 | Date of Birth |

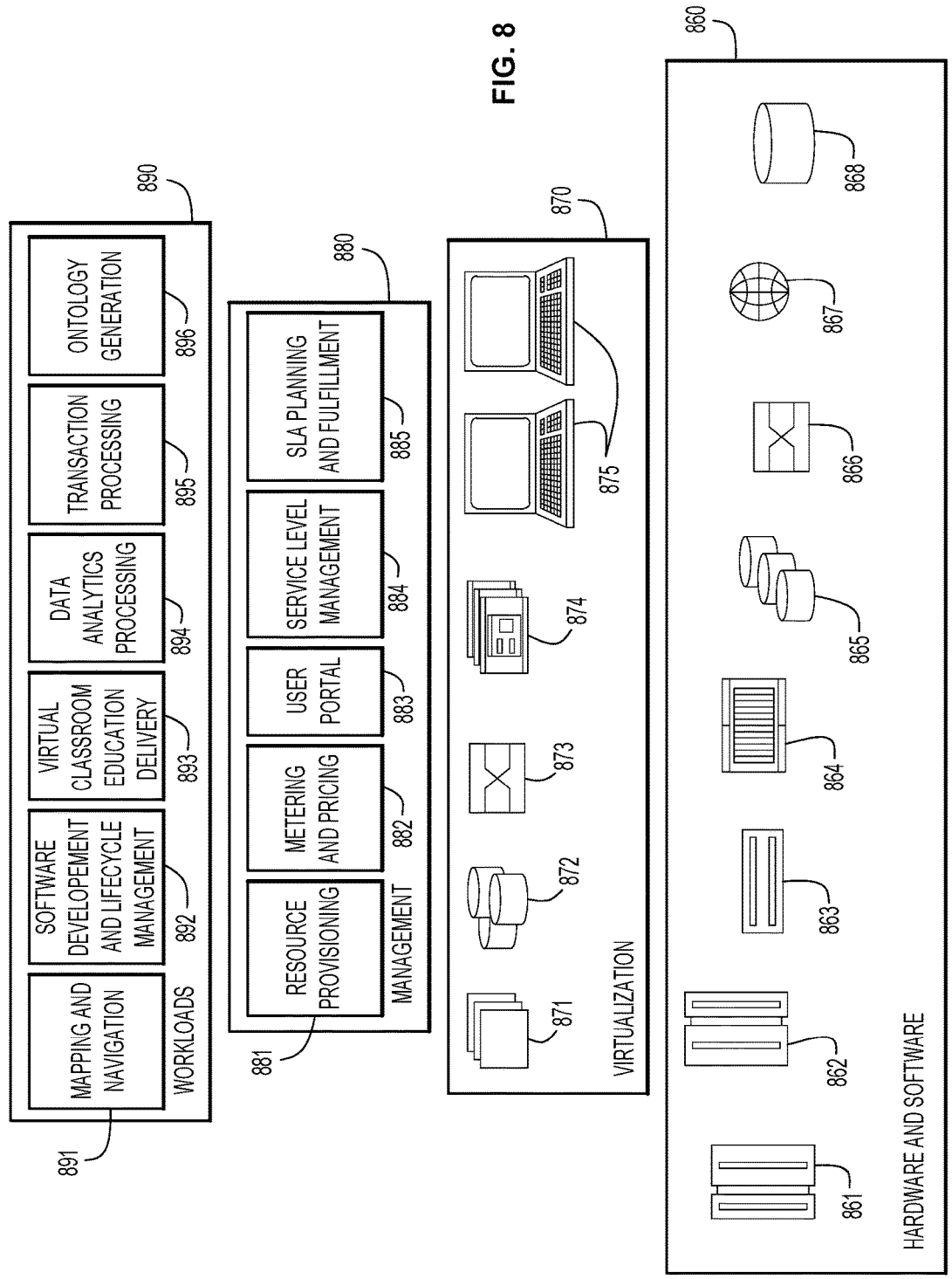

AUTOMATIC ONTOLOGY GENERATION

BACKGROUND

An embodiment of the present invention relates to automatic ontology generation, and more specifically, to automatic ontology generation using a semantic network.

An ontology is a formal naming and definition of the types, properties, and interrelationships of the entities that exist for a particular domain.

Important business information (such as customer information) is often stored repeatedly in multiple repositories within enterprises. For different types of projects, data stored in many redundant copies of repositories needs to be found, harmonized and moved into a single target system. Examples of such projects may include data warehousing, application consolidation towards System Applications Products (SAP) applications or Master Data Management (MDM).

Master Data Management addresses customer data duplication by finding a most important subset of data, called master data, and consolidating it in a single repository or group of connected repositories. Large enterprises have hundreds of source systems with data that needs to be fed into a common target system such as a Master Data Management system. The process of analyzing shape and meaning of data in legacy systems and mapping them to a common ontology requires very substantial manual efforts that may be error prone. There is thus a need to automatically build a common ontology for these projects for the domain of interest (e.g. master data, transactional data, etc.).

Building an ontology for a MDM repository conventionally starts with interviewing business stakeholders to determine general concepts and types of entities present in source systems. Once the high level concepts have been determined, the typical approaches for constructing detailed ontology are as follows.

Manually inspecting source system metadata, finding commonalities between business concepts and their properties, and manually constructing the desired ontology for the particular set of source systems.

Starting with a default ontology that includes most frequently used entity types and attributes, and customizing it for a particular implementation by adding new entity types and properties, and renaming a default one to represent business terms.

Starting with a detailed ontology of all entity types and attributes for specific industry (for example, banking models, insurance models) and customizing it.

All of these approaches require a subsequent step of mapping the final ontology back to source systems, so that the new ontology can be used to extract data from the source to move it to a common target; for example, from many sources with master data into a centralized MDM repository.

Manually inspecting hundreds of source systems, understanding the meaning of the data in the systems, and manually mapping them to a target ontology is very time consuming. As a result, most of the enterprises cannot afford to introduce MDM systems on an enterprise scale, or would only implement it for the small subset of systems.

SUMMARY

According to an aspect of the present invention there is provided a computer-implemented method for automatic ontology generation for a set of data from multiple data sources, comprising: providing a semantic network of known concepts as an ontology template for a target domain of knowledge with the known concepts defined as base entity types; reading logical groupings of data and associated technical metadata from the data sources; applying data discovery techniques to detect semantic and/or syntactic classification of data attributes in the logical groupings of data; for each of the logical groupings of data, generating an entity type with properties for the data attributes and adding the generated entity type to the semantic network with classifications of the properties as derived from the applied data discovery techniques; detecting semantic meanings of the generated entity types and associating them to other entity types within the semantic network; and outputting the semantic network as a resultant ontology for the set of data.

Providing a semantic network of known concepts as an ontology template may include providing the base entity types with properties based on attributes and a set of known classifications of the properties, and wherein the classifications detected by applying data discovery techniques may be the known classifications of the base entity types.

Generating an entity type with properties for the data attributes may use names for the generated entity type and properties from the associated technical metadata.

The method may include providing a generated entity type with stored lineage to the data source from which it originates by linking to technical metadata of the data source. The method may include using the stored lineage to optimize storage of the logical groupings of data across the data sources.

Detecting semantic and/or syntactic classification may include providing a probability of correct classification based on a compliance with constraints of a classification. Detecting semantic meaning of the generated entity types and associating them to other entity types may include: using common properties and/or classifications of entities to associate entity types. Associating generated entity types to other entity types may include relating types and/or determining subtypes and parent-types.

Generating entity types with properties may generate entity types for a subset of the set of data in the data sources, wherein the subset is chosen based on the popularity of the data as determined by the number of foreign key references.

The method may include optimizing the semantic network to output the resultant ontology including creating a map of common and unique properties with classifications across entity types and/or providing additional classifications for entity types.

The method may include enabling user review and input during stages of the generation of the ontology, including the one or more stages of: reading logical groupings of data, detecting classifications of data attributes, generating entity types, associating entity types, and output of the resultant ontology.

The method may be provided as a service in a cloud environment.

According to another aspect of the present invention there is provided a system for automatic ontology generation for a set of data from multiple data sources, comprising: a processor and a memory configured to provide computer program instructions to the processor to execute the function of the components; a seed component for providing a semantic network of known concepts as an ontology template for a target domain of knowledge with the known concepts defined as base entity types; a source reading component for reading logical groupings of data and associated technical metadata from the data sources; a data classification component for applying data discovery techniques to detect semantic and/or syntactic classification of data attributes in the logical groupings of data; an entity type component, for each of the logical groupings of data, generating an entity type with properties for the data attributes and adding the generated entity type to the semantic network with classifications of the properties as derived from the applied data discovery techniques; an entity associating component detecting semantic meanings of the generated entity types and associating them to other entity types within the semantic network; and an ontology output component for outputting the semantic network as a resultant ontology for the set of data.

The seed component may include providing the base entity types with properties based on attributes and a set of known classifications of the properties, and wherein the classifications detected by the data discovery component are the known classifications of the base entity types.

The entity type component for generating an entity type with properties for the data attributes may include a naming component using names for the generated entity type and properties from the associated technical metadata.

The system may include an entity metadata linking component for providing a generated entity type with stored lineage to the data source from which it originates by linking to technical metadata of the data source.

The data classification component may include a probability component for providing a probability of correct classification based on a compliance with constraints of a classification.

The entity type component may generate entity types for a subset of the set of data in the data sources, wherein the subset is chosen based on the popularity of the data as determined by the number of foreign key references.

The entity associating component may use common properties and/or classifications of entities to associate entity types and wherein the associating relates types and/or determines subtypes and parent-types.

The system may include an optimization component for optimizing the semantic network to output the resultant ontology including creating a map of common and unique properties with classifications across entity types and/or providing additional classifications for entity types.

The system may include a user interface for enabling user review and input during stages of the generation of the ontology, including one or more stages of: reading logical groupings of data, detecting classifications of data attributes, generation of entity types, associating entity types, and output of resultant ontology.

According to a further aspect of the present invention there is provided a data structure in the form of a generated ontology for a set of data from multiple data sources including: a semantic network of known concepts for a target domain of knowledge with the known concepts defined as base entity types with properties based on attributes and a set of known classification of the properties; multiple generated entity types each for a logical grouping of data from the multiple data sources, each generated entity type having properties for data attributes of the logical grouping of data and classifications of the properties as derived from data discovery techniques to detect semantic and/or syntactic classifications; and wherein the base entity types and generated entity types are associated by detecting semantic meanings of the generated entity types and optimized in the ontology.

The data structure may include a link from a generated entity type to an originating data source using technical metadata of a logical grouping of data on which the generated entity type is based.

The base entity types and generated entity types may be associated using common properties and/or classifications of entities to associate entity types.

According to a further aspect of the present invention there is provided a computer program product for automatic ontology generation for a set of data from multiple data sources, the computer program product comprising a computer readable storage medium having program instructions embodied therewith, the program instructions executable by a processor to cause the processor to: provide a semantic network of known concepts as an ontology template for a target domain of knowledge with the known concepts defined as base entity types; read logical groupings of data and associated technical metadata from the data sources; apply data discovery techniques to detect semantic and/or syntactic classification of data attributes in the logical groupings of data; for each of the logical groupings of data, generate an entity type with properties for the data attributes and add the generated entity type to the semantic network with classifications of the properties as derived from the applied data discovery techniques; detect semantic meanings of the generated entity types and associating them to other entity types within the semantic network; and output the semantic network as a resultant ontology for the set of data.

Providing a semantic network of known concepts as an ontology template may include providing the base entity types with properties based on attributes and a set of known classification of the properties and wherein the classifications detected by applying data discovery techniques are the known classifications of the base entity types.

The described aspects of the invention provide the advantage of removing error-prone, time-consuming work to understand data in source systems and map them to a target ontology.

BRIEF DESCRIPTION OF THE DRAWINGS

The subject matter regarded as an embodiment of the invention is particularly pointed out and distinctly claimed in the concluding portion of the specification. The invention embodiments, both as to organization and method of operation, together with aspects, features, and advantages thereof, may best be understood by reference to the following detailed description when read with the accompanying drawings.

Preferred embodiments of the present invention will now be described, by way of example only, with reference to the following drawings in which:

FIG. 4 is a schematic diagram illustrating a worked example in accordance with the present invention;

FIG. 8 is a diagram of abstraction model layers of a cloud computing environment in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system automatically construct an ontology of data across various structured sources of data which may be provided in one or more data management systems (for example, tables in database). The method includes enriching the technical metadata of the structured sources of data with semantic and business metadata using classification and data fingerprinting algorithms. The method applies automatic semantic equivalency detection between known domain concepts and data in the structured sources of data, and generates a detailed ontology of data retaining business semantics of the sources.

The method for generating an ontology for a set of data across various structured sources of data includes providing a semantic network of concepts as an ontology template for a target domain of knowledge. The sources of data may be read to identify the set of data and metadata associated with the data. Data discovery techniques may be used to detect semantic and syntactic classification of data attributes in the source data.

For each logical grouping of data in the sources of data, for example, a logical grouping of data may be a table; the method may generate an entity type with properties and classifications to be added to the semantic network. The method further includes detecting semantic meaning of the newly generated entity types and associating them to other entity types within the semantic network.

The described method and system provide an automated approach to building an ontology for a particular domain starting with some base concepts. While the ontology is built-up by the proposed algorithms crawling, discovering, analyzing and understanding the many source systems, the data models related to the ontology concepts managed by the sources are linked to the ontology as well.

As a result, not only is an ontology created but the relationships of data across many sources are brought into the light as it is now possible to exploit the business and technical metadata. For example, by applying business and technical lineage to the metadata, it is possible to optimize storage costs by also looking at how redundancies could be eliminated. For the data moved for the common target where the harmonized data is stored, transformation ETL (Extract, Transform, Load) logic may be generated exploiting the generated mappings.

Figure 1:
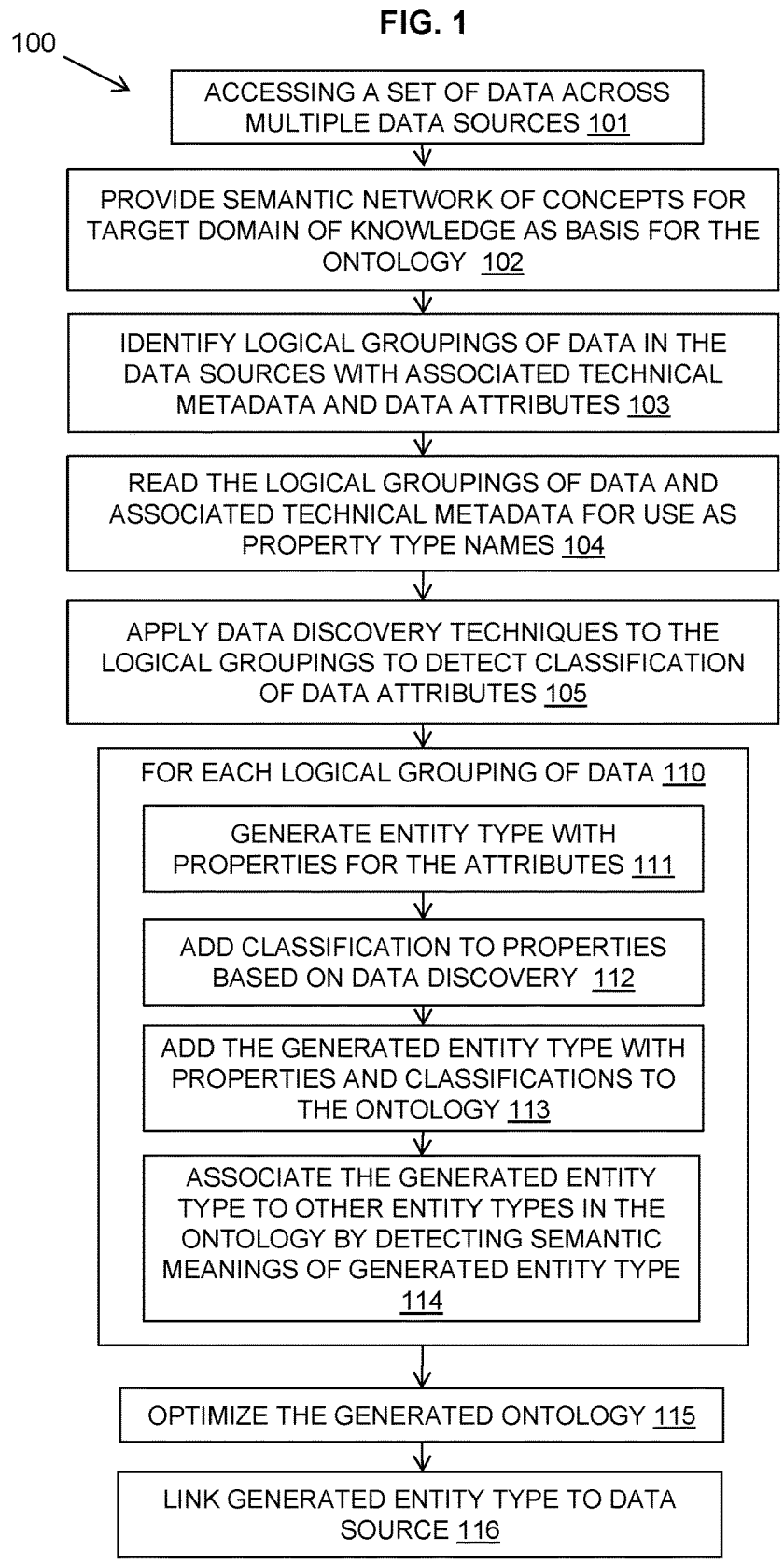
FIG. 1 is a flow diagram of an example embodiment of a method in accordance with the present invention.

Referring to FIG. 1, a flow diagram 100 shows an example embodiment of the described method.

As shown in FIG. 1, a set of data may be accessed at 101 from multiple structured data sources. For example, the multiple data sources may be multiple repositories of an enterprise, or legacy systems. The set of data may be scanned from source tables of the multiple data sources.

A semantic network may be provided at 102 having concepts for a target domain of knowledge which is used as an ontology template as a basis for the generated ontology. This seeds the method with basic semantic network of concepts for a target domain of knowledge. The concepts are defined as base entity types in the ontology template.

The base entity types for the concepts may have properties based on their attribute names and a set of known classifications. The properties may have associates provided in the ontology template to the classifications.

Logical groupings of data attributes within the data sources may be identified at 103 with associated technical metadata (such as database schema, table data types, column names and keys). Logical grouping of data attributes form data entities that represent something real (for example, a person, a claim, an account, an address). Data attributes are may be columns in a table or comma separated value (CSV) file. It is not known how many entity types may be stored in the same table (for example, in legacy systems often the account and person who owns account are stored in same table). Therefore the meaning of attributes in a source table must be determined to work out what type of entities might be stored there.

The logical groupings of data may be read at 104, for example by scanning a table, to identify the data and its associated technical metadata. The technical metadata may be used as entity type and properties type names.

The method may apply at 105 data discovery techniques for data classification to detect semantic and syntactic classification of the data attributes in the multiple data sources.

For each logical grouping of data at 110, the following method may be carried out. For each logical grouping of data, for example, a scanned data source, the method may automatically generate at 111 an entity type with properties based on the attributes of the logical grouping. This may reuse discovered metadata of the logical grouping as entity type and properties type names. Classifications may be added at 112 to the properties based on the data discovering in step 105. The generated entity type may be added at 113 to the ontology template along with its properties and their classifications to generate an ontology.

The method may associate at 114 the generated entity type with other entity types by detecting possible semantic meanings of the newly generated entity type and may associate it to other entity types within the ontology by applying various techniques described in more detail below. This association may use common properties and/or classifications. The association may relate types or may determine subtypes.

Once all the data sources have been processed, the resultant ontology may be automatically analyzed and optimized at 115 by applying various techniques. Optionally, the resultant ontology may be manually optimized to review the generated ontology and manually tag entity types with business classifications. The method may use the additional manual classifications to further automatically optimize the ontology.

The technical metadata such as data models related to a generated entity type in the ontology template may be linked at 116 to the data sources from which the logical grouping of data was read.

As a result, not only is an ontology created but the relationships of data across many data sources are brought into the light as it is now possible to exploit the business and technical metadata. For example, by applying business and technical lineage to the metadata, it is possible to optimize storage costs by also looking at how redundancies could be eliminated. For the data moved for the common target where the harmonized data is stored, transformation ETL (Extract, Transform, Load) logic may be generated exploiting the generated mappings.

Further details are given below of the steps defined in the flow diagram 100 of FIG. 1 with reference to FIG. 2A in the form of a schematic diagram showing an example embodiment of the described system 200.

Figure 2A:
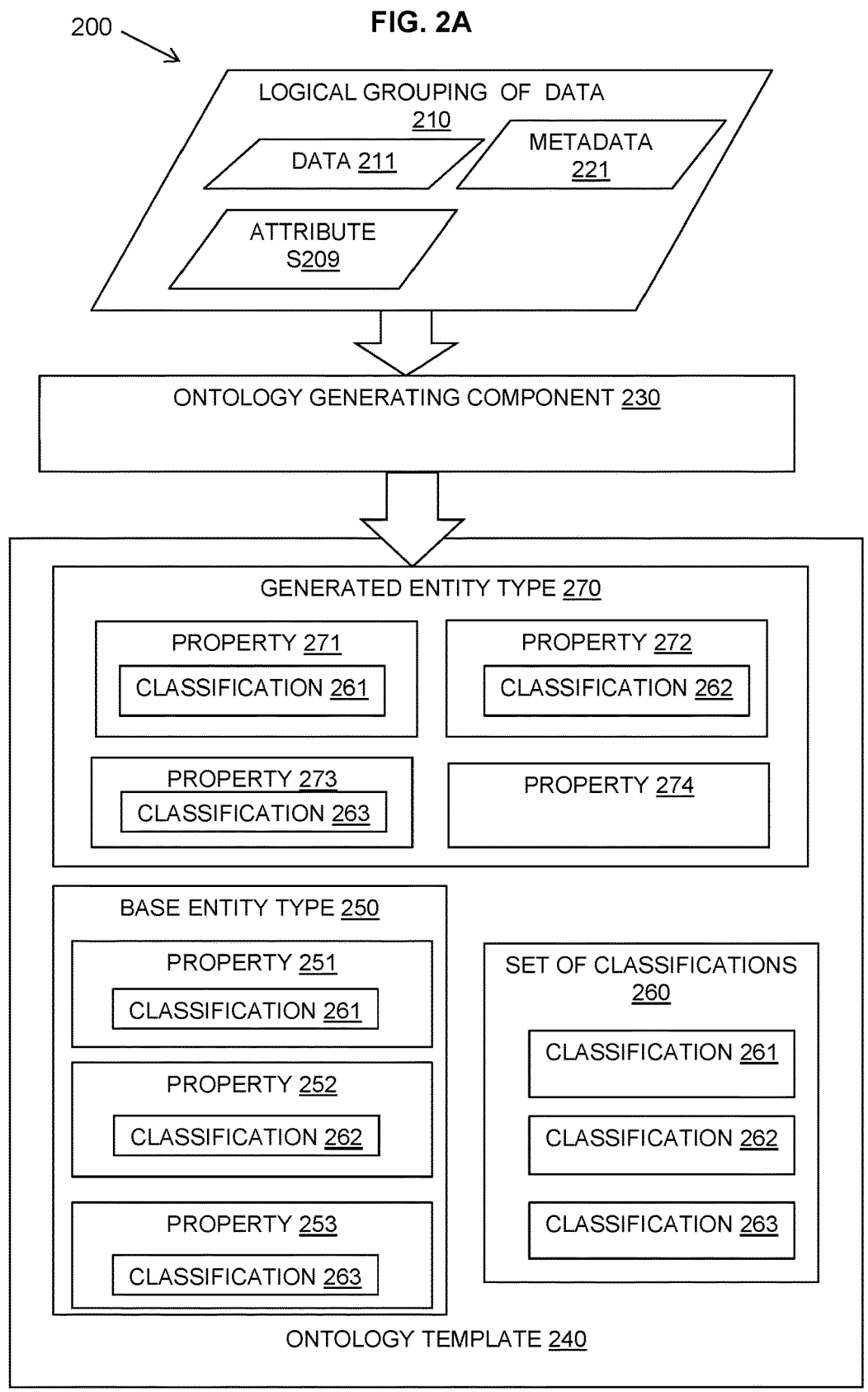
FIGS. 2A and 2B are schematic diagrams of an example embodiment of a system in accordance with the present invention.

In FIG. 2A, an ontology generating component 230 is shown which uses an ontology template 240 as a basis of a generated ontology.

Seeding

In FIG. 1, a semantic network may be provided at 102 having concepts for a target domain of knowledge which is used as an ontology template 240 as a basis for a generated ontology. The described method and system are seeded with a basic semantic network of concepts for a target domain of knowledge.

For example, when the generating ontology is for a master data management (MDM) system, the ontology template may start with set of base entity types 250 or concepts that are typically present in MDM ontologies. For example, these base entity types 250 may include "person", "organization", "account", "location" and "household", and typical entity relationships may be "person"-"lives at"-"location".

The base entity types 250 may include attributes whose names are provided as properties 251-253 of the base entity type 250. Associations may be stored between the properties 251-253 and known classifications 261-263. The known classifications may be stored as a set of classifications 260 in the ontology template 240 and linked to the properties 251-253 of the base entity types 250.

The ontology template 240 may include, for example, basic entity type 250 for "Person" as containing attributes "Name", "Address", "DoB" which form properties 251-253. Associations are provided between the properties 251-253 representing the attribute name and known classifications 261-263 such as "First Name", "Last Name", "Full Name", "Greeting".

Data Classification

In FIG. 1, the method 100 may read at 104 the logical groupings of data and its associated technical metadata, and may apply at 105 data discovery techniques to detect semantic and syntactic classification of data attributes in the logical grouping of data.

In FIG. 2A, a logical grouping of data 210 is shown with data 211 having attributes 209 and technical metadata 221.

Data discovery techniques may have libraries to check for formats of known concepts. For example: "@" and "." in values in a particular string column suggest that the data is likely to be an email; if it is an integer pattern, for example 333-22-4444, this is an indication of a Social Security Number (SSN). Such techniques are part of "data fingerprinting" algorithms in data profiling tools. As a result, the technical metadata of columns in a logical grouping of data including such data may be enriched with business metadata or classifications suggesting a certain concept "contact method"/"email" or "identifier"/"social security number".

A probability of the suggested business metadata or classification may be provided based, for example, on how many values in a column are compliant with the constraints such a concept imposes on instances of its type.

The probability may be used to validate an assumption that the data classification is correct. For example, a SSN is expected to be relatively unique and if the column format looks like SSN but too many identical values are found in the column, then one of two things are true: a) the assigned classification is correct but the quality of the data in the column is bad; or b) the meaning of the data in this column is not understood.

The data discovery process may assign a classification of "person" to the table named "Child" and a classification of "surname" to the field name "LN". Classifications 260 are detected based on known semantic network of concepts it was seeded with.

Entity Type Generation

For each logical grouping of data 210, for example, in the form of scanned source tables or datasets, the method automatically generates at 111 a generated entity type 270 with properties 271-274 for the attributes of the logical grouping of data 210. This may reuse discovered technical metadata of the logical grouping as entity type and properties type names.

Classifications 261-263 may be added at 112 to the properties 271-274 as assigned in the preceding processing by the data discovery process.

The generated entity type 270 may be added at 113 to the ontology template 240, along with its properties 271-273 and the classifications 261-263 referenced to the set of classifications 260 of the ontology template 240.

A mapping between the source dataset that caused the generation of this entity type and the generated entity type is maintained to store lineage. For example, after scanning a "Customer" table, a new entity type "Customer" is generated and added to the ontology template. The system keeps track of what data source caused the generation of the entity type providing a store lineage.

Inspecting each and every table in each legacy system may be computationally expensive. In the alternative embodiment, only a subset of source tables may be inspected and added into ontology. The subset may be chosen based on the "popularity" of the data as determined by most foreign key references, most often found in buffer pull of a database, most often read by ETL system etc.

Semantic Equivalency

The method may associate at 114 a generated entity type with other entity types in the ontology template by detecting possible semantic meanings of the newly generated entity type and associating it to other entity types as related types or as subtypes. This may be carried out by applying various techniques as described below. This may use the properties and/or classifications of the generated entity types.

Therefore, when a source system attribute is found with classification "LastName", it may be suggested that table contains "Person" business concept.

One technique may perform entity resolution or matching of data for the newly generated entity type against other well understood entity types. For example, matching data of new "Customer" entity type with data of "Prospect" entity type that was previously determined to have contained data for "person" base concept. The system inspects a match rate between "Customer" and "Prospect" sources and determines if the "Customer" entity is the subtype of the "Person" base entity. This technique is used when the method sees common classifications between two entities, or when entities have a notable amount of common property values (for example, as explained in the graph analytics below).

Another technique may use graph analytics to construct communities of features across all types, looking for the same attribute values occurring in different entity records. Dense communities of properties may be found and new entity types formed with a common set of properties (for example, "location"). Alternatively, these may be associated with an existing entity type with the same set of properties (for example, data in "Child" and "Person" entity types would share many similar values, which means data in those types have the same meaning).

Another technique may use table level classifications from the data discovery process or may apply word disambiguation processes to newly derived entity type names and property names to find possible semantic similarities between generated entity types. For example, entity type "Child" and entity type "Individual" could both be subtypes of base entity type "Person".

A further technique may include analyzing "possibly related" derived relationships detected by entity resolution processes to find reasons for commonality between data. Sets of entity properties frequently causing "possibly related" relationships may be pulled out into separate entity type and relationships. For example, when entity type "Client" and entity type "Customer" have derived relationships due to the same "address" and "last name", the method may automatically generate a new entity type "AddressAndLastName" with properties "address" and "last name" and add it to the ontology template. The method may associate "Client" and "Customer" entity types to "AddressAndLastName" entity type with relationship type "have same", thus further enhancing the semantic network of concepts in the generated ontology.

A further technique may include leveraging lineage to understand how Extract, Transform, and Load (ETL) is copying data within an enterprise to build lineage graphs of ETL infrastructure to analyze further. Enterprise Information Integration platforms create technical metadata for everything that occurs in ETL programs moving data between systems. On that metadata the metadata tooling of such platforms provides data lineage functionality to see how data flows between systems and how it's transformed, etc. For example, it is assumed in System A that the proposed algorithm detected a certain concept (e.g. a person) in the data stored in a particular table. By leveraging data lineage functionality on the technical metadata it can be detected if the table storing person information in System A receives person data from another System B (and which tables in system B). So if the algorithm is able to link for any particular system content in a table to the ontology, the algorithm may link in a similar fashion the sources feeding that table from other systems to the same concept in the ontology. The same logic may be applied for systems that read from the table in System A where the data lineage graph shows no transformations that could have impact to the concept.

A further technique may use an information retrieval based algorithm such as HELIX by IBM Research (HELIX and IBM are trade marks of International Business Machines Corporation). This is an information retrieval based algorithm comparing entity type data with "ground truth" datasets of known semantics.

A combination of one or more of the above techniques may be used.

Automatic Ontology Optimization

The method may analyze and optimize at 114 the generated ontology by applying various techniques.

An example technique may create a map of common and unique properties with classifications across detected entity types. Frequently occurring common properties may be added to base entity concepts originally seeded within ontology template, thus enriching entity types on higher levels of ontology with new properties. From an MDM point of view, these higher levels of ontology represent most the important master data.

Another example technique uses semantic fingerprinting to find values in a table column, analyzer software may determine correlations between columns in the same dataset or across datasets (for example, by detecting foreign key relationships between tables) and therefore may determine that a column is related to other data and thus provide additional domain classifications, or grouping several entities types together.

Manual Ontology Optimization

Optionally, manual ontology optimization may be carried out by a stakeholder review of a generated ontology to manually tag entity types with business classifications. The method may use additional classifications to further automatically optimize the ontology.

Figure 2B:
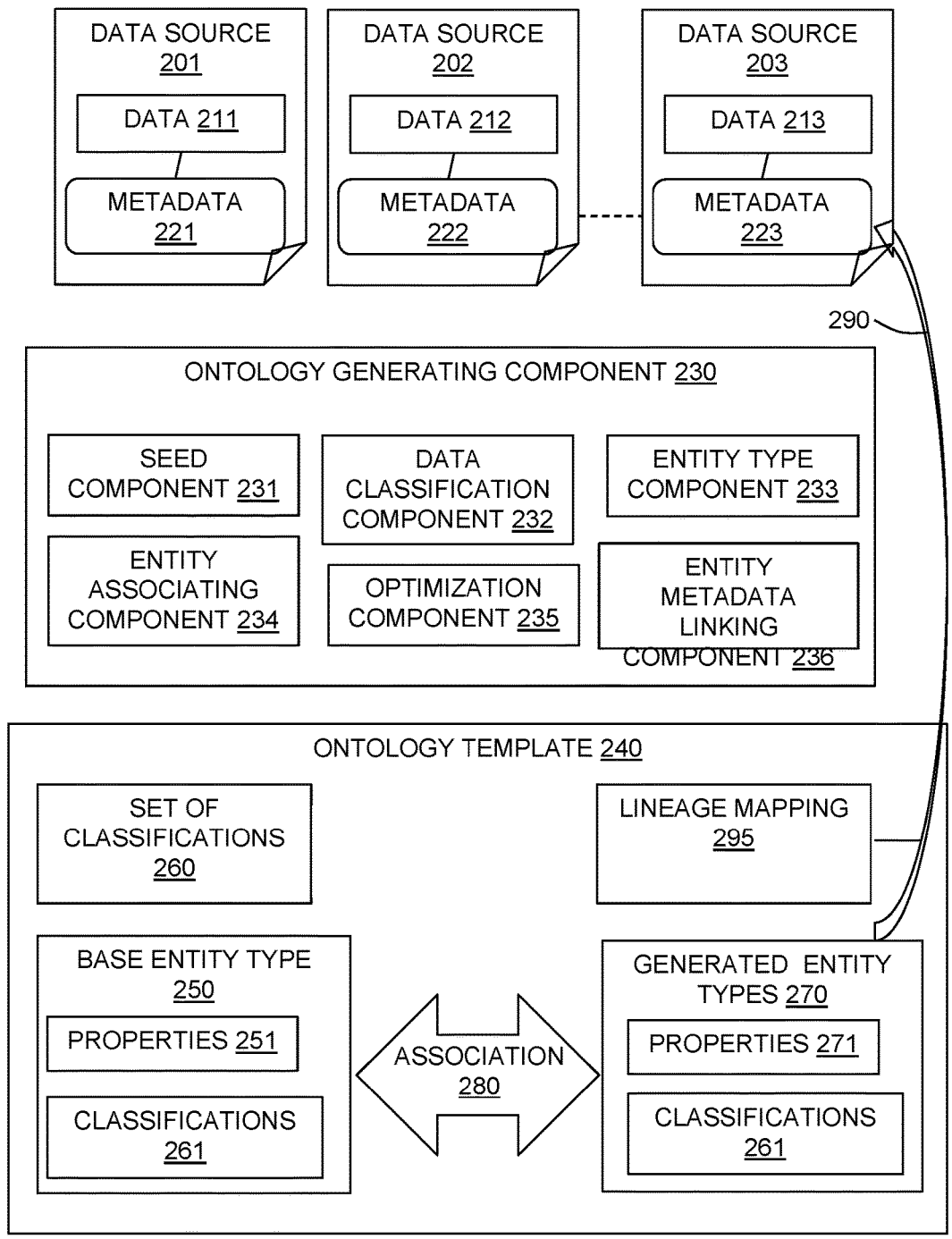

Referring to FIG. 2B, a schematic diagram shows the example embodiment of FIG. 2A with additional details.

A group of structure data sources 201-203 may be provided. For example, these may be within an enterprise and may be multiple repositories from legacy systems The data sources 201-203 may have data 211-213 with associated technical metadata 221-223 such as database schema, table data types, column names and keys. From these data sources 201-203 or from a single data source 201, logical groupings of data 210 illustrated in FIG. 2A are read. For example, a logical grouping of data may be a table relating to customer information.

Further details of the ontology generating component 230 are provided for using an ontology template 240 to generate an ontology for the data sources 201-203. The ontology template 240 includes initial base entity types 250 (one base entity type shown for illustration) having properties 251 with classifications 261 which may link to a set of classifications 260.

The ontology generating component 230 includes generated entity types 270 (again one shown for illustration) having properties 271 and classifications 261 which may link to the set of classifications 260 defined in the template for the base entity types 250. The generated entity types 270 may be associated 280 with other entity types including the base entity types 250 to generate an ontology for the data sources 201-203 from the ontology template 240.

In addition, a lineage mapping 295 may be provided mapping a generated entity type 270 with a link 290 via its technical metadata 223 to the data source 203 from which it is derived providing a stored lineage that may be used to explore the relationships between data across different data sources 201-203.

The ontology generating component 230 may include a seed component 231 for seeding the ontology template 240 with the base entity types 250. The ontology generating component 230 may include a data classification component 232 for classifying the data 211-213 from the data sources 201-203 using data discovery techniques. The ontology generating component 230 may include an entity type component 233 for generating entity types 270 for logical groupings of data from the data sources 201-203, and an entity associating component 234 for associating 280 newly generated entity types 270 with the base entity types 250 of the ontology template 240 as well as other generated entity types 270. The ontology generating component 230 may include an optimization component 235 for optimizing the resultant ontology. The ontology generating component 230 may also include an entity metadata linking component 236 for providing the linking 290 of a generated entity type 270 to a data source 201 from which it originated via its technical metadata 223 and as stored in the lineage mapping 295.

Figure 3:
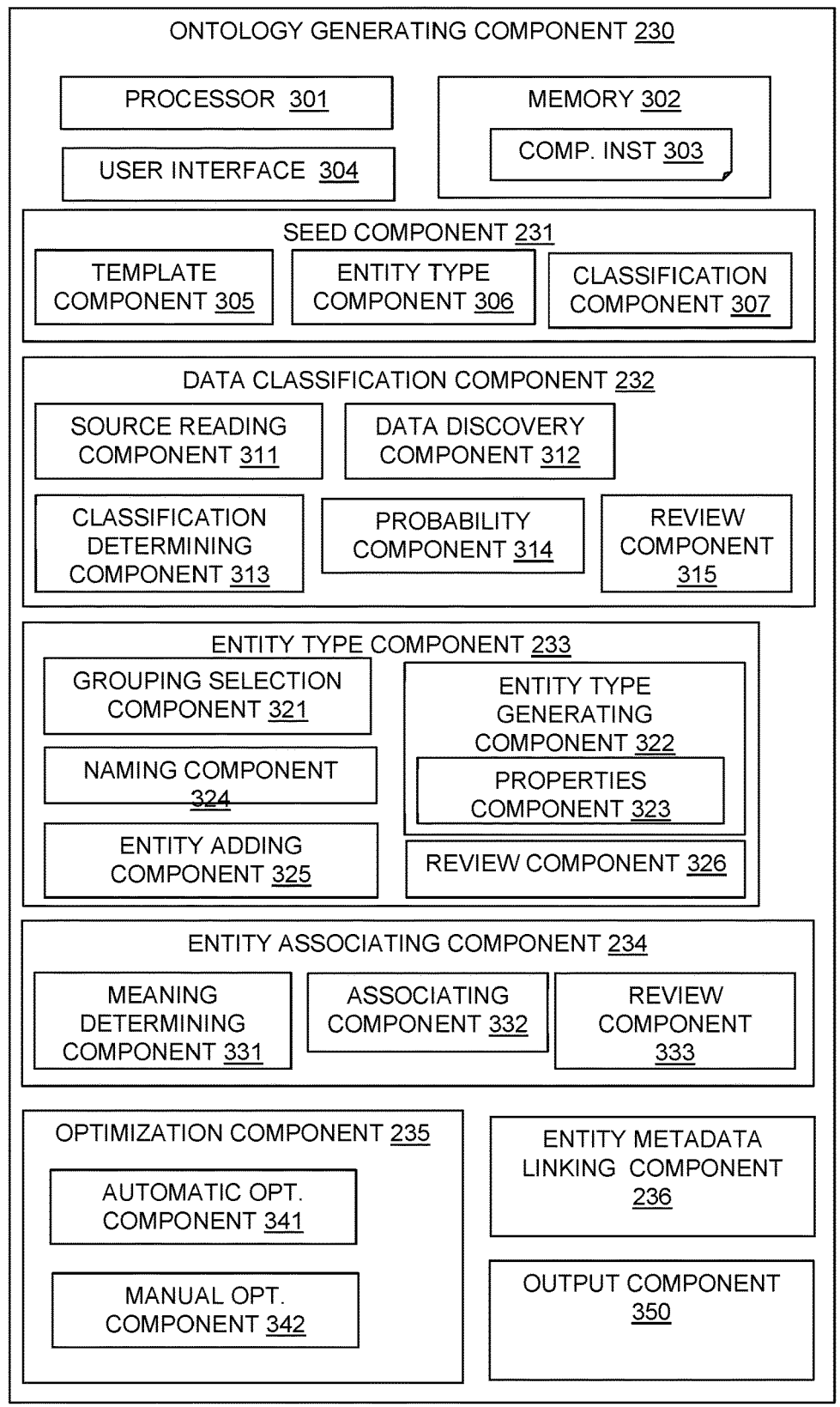
FIG. 3 is block diagram of an example embodiment of a system in accordance with the present invention.

Referring to FIG. 3, a block diagram shows a more detailed example embodiment of the ontology generating component 230.

The ontology generating component 230 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components. The ontology generating component 230 may also include a user interface 304 for providing feedback on the development of the ontology and for receiving user input.

The seed component 231 of the ontology generating component 230 may include a template component 305 for providing a ontology template, an entity type component 306 for seeding base entity types with properties in the ontology template, and a classification component 307 for providing classifications in the ontology template.

In one embodiment, the ontology being built by this system may be constructed in the memory and then serialized, for example, as Java Script Object Notification (JSON) string for more permanent storage in a cloud-based distributed database as a service (DBaaS). Classifications associated with the seed semantic network are stored in the seed semantic network, in this case stored as JSON.

The data classification component 232 of the ontology generating component 230 may include a source reading component 311 for reading the data and metadata of the data sources and a data discovery component 312 for using data discovery techniques to detect semantic and syntactic classification of data attribute in the data sources. The data classification component 232 may also include a classification determining component 313 for identifying a classification of the read data and a probability component 314 for determining a probability that a classification is correct. The data classification component 232 may include a review component 315 for presenting classifications to a user for review via the user interface 304.

The entity type component 233 of the ontology generating component 230 may include a grouping selection component 321 for selecting a logical grouping of data from data sources and applying an entity type generating component 322 for generating entity types for the logical grouping. The entity type generating component 322 may include a properties component 323 for generating properties for the generated entity types. The entity type component 233 may include a naming component 324 for naming the generated entity types using the discovered metadata of the data source. The entity type component 233 may include an entity adding component 325 for adding the generated entity types to the ontology template. The entity type component 233 may include a review component 326 for enabling review of the generated entity type, properties and classification via the user interface 304.

The entity associating component 234 of the ontology generating component 230 may include a meaning determining component 331 for determining possible semantic meaning of the newly generated entity types and matching them to other entity types including the base entity types and an associating component 332 for associating the generated entity types with other entity types including the base entity types. The entity associating component 234 may include a review component 333 for enabling review of the entity type associations via the user interface 304.

The optimization component 235 of the ontology generating component 230 may include an automatic optimization component 341 and a manual optimization component 342 for optimizing the resultant ontology by automatic analysis with optional manual input via the user interface 304.

The entity metadata linking component 236 may provide a lineage mapping in the form of a link or reference between a generated entity type and a data source from which it originated by linking the technical metadata used. The lineage mapping may be stored in the generated ontology or may be stored externally and accessible by the generated ontology and the data sources.

The ontology generating component 230 may include an output component 350 for outputting the resultant ontology for use in relation to the data sources.

Figure 5:
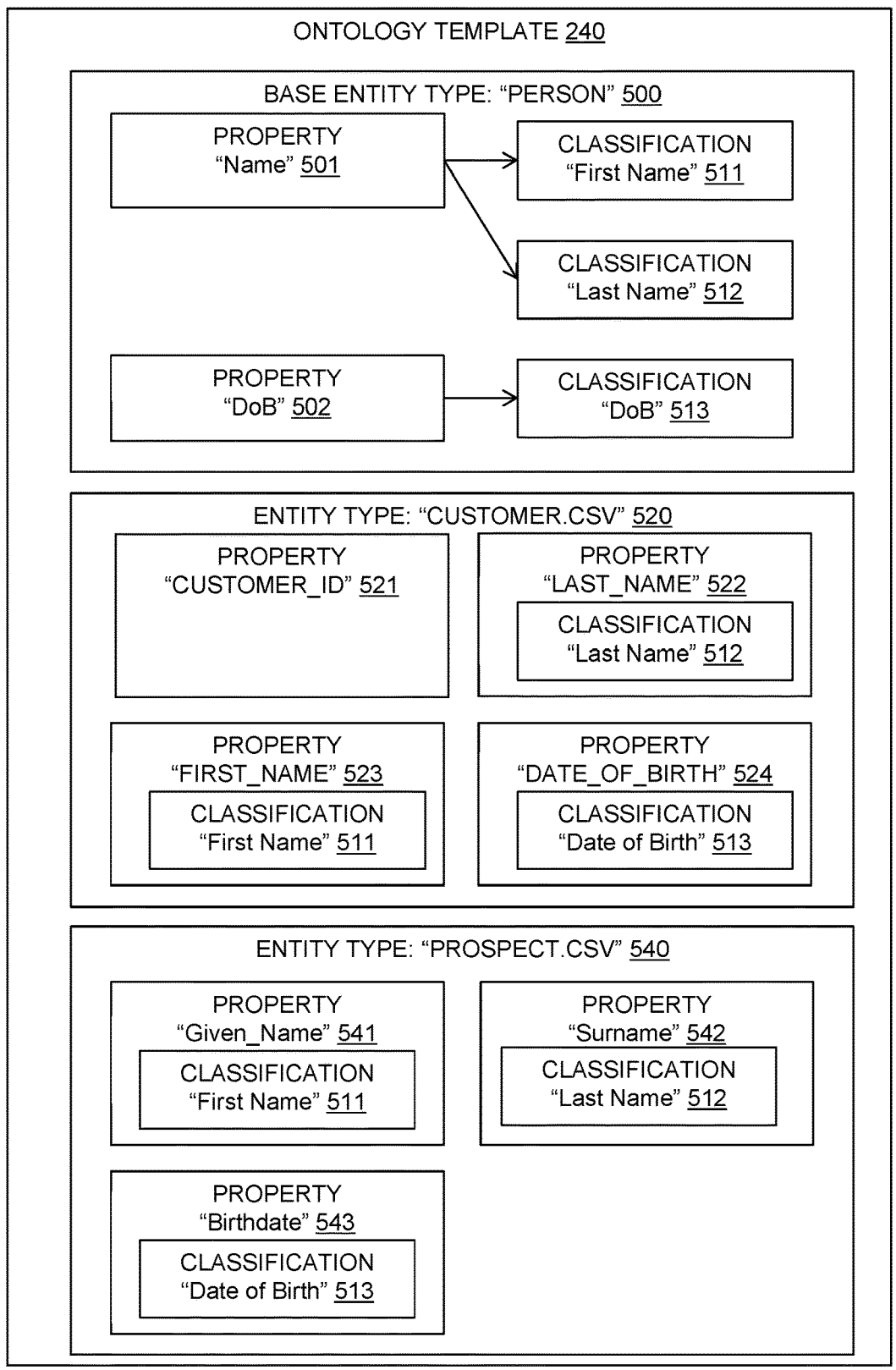
FIG. 5 is a schematic diagram illustrating the generation of an ontology using the worked example of FIG. 4.

FIGS. 4 and 5 show a worked example using two datasets 400, 410 as logical groupings of data which are tables taken from a data repository.

The first dataset S1 400 has a name "Customer.csv". It is a comma separated values (CSV) file with columns names "CUSTOMER_ID", "LAST_NAME", "FIRST_NAME", "DATE_OF_BIRTH" and many more. The second dataset S2 410 has a name "Prospect.cvs" and has columns "Given_Name", "Surname", "Birthdate" and many more.

A CSV file allows data to be saved in a table-structured format. CSVs look like a normal spreadsheet but with a .csv extension. Traditionally they take the form of a text file containing information separated by commas, hence the name.

A review interface 420 may be provided during processing by the ontology generating component and it is shown that the system assigned the classification of "First Name" 421 to the "FIRST_NAME" column data of the dataset S1 400 "Customer.cvs" and to the "Given_Name" column data of the dataset S2 410 "Prospect.cvs" since they have the same semantic meaning.

In this example, if both datasets S1 400 "Customer.csv" and S2 410 "Prospect.csv" were processed, two generated entity types 520, 540 will be created and added to the ontology template 240. This is illustrated in FIG. 5.

After scanning the "Customer.csv" table 400, a new generated entity type 520 "Customer.CSV" is generated and added to the ontology template 240. The generated entity type 520 called "Customer.CSV" has properties "CUSTOMER_ID" 521, "LAST_NAME" 522, "FIRST_NAME" 523, "DATE_OF_BIRTH" 524 and more (to include properties to accommodate all attributes of the source file).

After scanning the "Prospect.csv" table 410, a new generated entity type 540 "Prospect.CSV" is generated and added to the ontology template 240. The generated entity type 540 called "Prospect.CSV" has properties "Given Name" 541, "Surname" 542, "Birthdate" 543 and more (to include properties to accommodate all attributes of the source file).

The ontology template 240 includes a base entity type 500 for "Person" which includes the properties of "Name" 501 and "DoB" 502, which reference the classifications of "First Name" 511, "Last Name" 512, and "Date of Birth" 513.

The generated entity types 520, 540 may include classifications of their properties as determined by a data discovery process. In this example, the generated entity type 520 called "Customer.CSV" has property "LAST_NAME" 522 classified as "Last Name" 512, property "FIRST_NAME" 523 classified as "First Name" 511, and property "DATE_OF_BIRTH" 524 classified as "Date of Birth" 513.

The property "CUSTOMER_ID" 521 does not have a classification. Data that is not classified is not excluded as it may be useful. For example, a property may be a "client value indicator" which is not classified but which may be very useful.

In this example, the generated entity type 540 called "Prospect.CSV" has property "Surname" 542 classified as "Last Name" 512, property "Given_Name" 541 classified as "First Name" 511, and property "Birthdate" 543 classified as "Date of Birth" 513.

Both generated entity types 520, 540 may be presented to the user for the feedback and an opportunity to review assigned classifications.

The described method and system automatically create the understanding or ontology giving the end user a complete picture of what is in the various data sources and how the entities in the various sources relate to each other. This understanding is a pre-condition process for any sort of subsequent entity matching.

The described method and system close a gap taking out a lot of error-prone, extremely time-consuming work so that entity matching may be applied.

Existing technologies on entity matching cannot be applied at this point. In cases where, for example, customer information should be consolidated from 6000+ source systems with little to no documentation as creators of the systems are no longer available, no one knows what is in these systems and how they relate to "features" or matching attributes the entity resolution algorithms need.

The described method and system provide the following benefits:
  Automatic creation of ontologies saving hundreds to thousands of project hours;
  Improved understanding of data by enriching its description with semantic business metadata;
  Creating a "browseable" catalog enabling business users to find what they are looking for;
  Through linkage of technical to business metadata its possible to detect information governance (e.g. detection of sensitive data in an ungoverned source system);
  Avoidance of manual errors;
  Identification of data redundancies for storage cost optimization; and
  Ability to generate major parts of the data harmonization movement infrastructure creating large cost savings compared to manual ETL job development and test.

Figure 6:
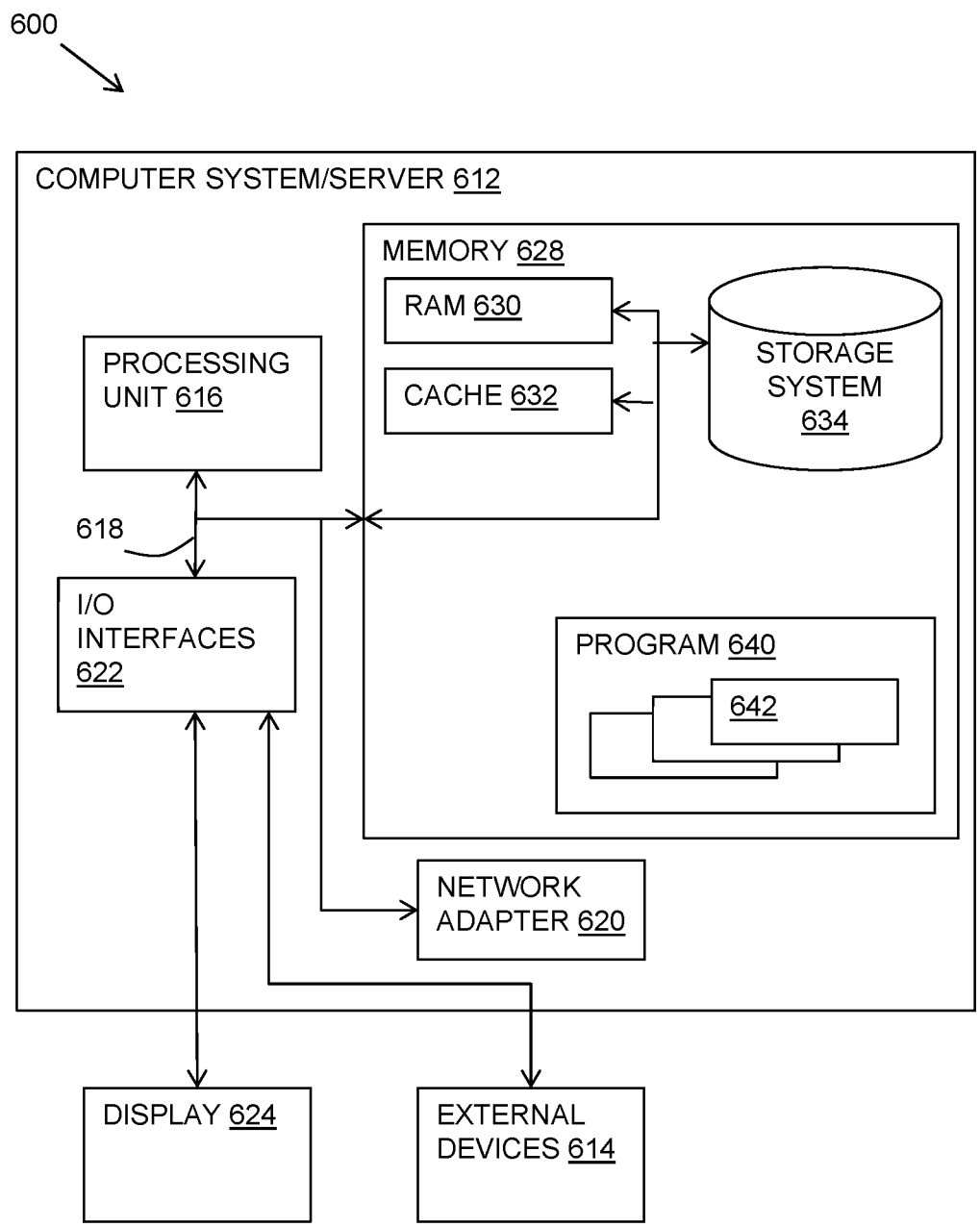
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
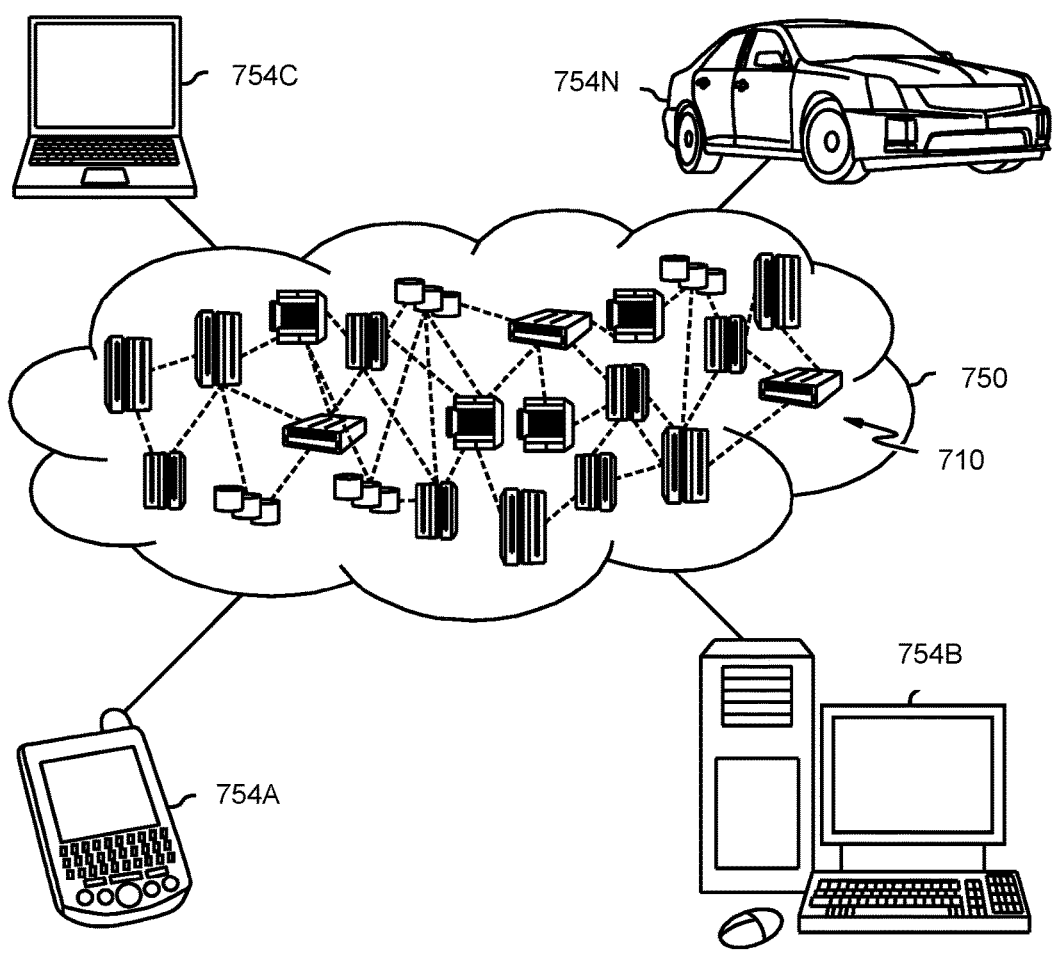
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and ontology generation 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for automatic ontology generation for consolidating and storing a set of data from a plurality of different data sources, comprising:
    providing, via at least one hardware processor, a semantic network of concepts as an ontology template for a target domain of knowledge with the concepts defined as base entity types;
    selecting from the plurality of different data sources, via the at least one hardware processor, a subset of logical groupings of data based on a number of foreign key references to data within the plurality of different data sources;
    reading, via the at least one hardware processor, the selected logical groupings of data and associated technical metadata from the plurality of different data sources;
    applying, via the at least one hardware processor, data discovery techniques to detect semantic and/or syntactic classification of data attributes in the selected logical groupings of data, wherein the data discovery techniques include:
        identifying formats of known concepts within the selected logical groupings of data to detect the semantic and/or syntactic classification of the data attributes indicating a corresponding concept; and
        validating the detected classification of the data attributes based on a quantity of values in the selected logical groupings of data satisfying constraints of the detected classification of the data attributes;
    for each of the selected logical groupings of data, generating, via the at least one hardware processor, an entity type with properties for the data attributes and adding the generated entity type to the semantic network with classifications of the properties as derived from the applied data discovery techniques;
    detecting, via the at least one hardware processor, semantic meanings of the generated entity types and associating the generated entity types to other entity types within the semantic network;
    outputting, via the at least one hardware processor, the semantic network as a resultant ontology for the set of data; and
    extracting, via the at least one hardware processor, the set of data from the plurality of different data sources and storing the extracted data in a centralized repository in accordance with the resultant ontology.

2. The method as claimed in claim 1, wherein providing a semantic network of concepts as an ontology template includes providing the base entity types with properties based on attributes and a set of classifications of the properties, and wherein the classifications detected by applying data discovery techniques are classifications of the base entity types.

3. The method as claimed in claim 1, wherein generating an entity type with properties for the data attributes uses names for the generated entity type and properties from the associated technical metadata.

4. The method as claimed in claim 1, including providing a generated entity type with stored lineage to the data source from which the generated entity type originates by linking to technical metadata of the data source.

5. The method as claimed in claim 4, including using the stored lineage to optimize storage of the logical groupings of data across the data sources.

6. The method as claimed in claim 1, wherein detecting semantic and/or syntactic classification includes providing a probability of correct classification based on a compliance with constraints of a classification.

7. The method as claimed in claim 1, wherein detecting semantic meanings of the generated entity types and associating the generated entity types to other entity types includes:
    using common properties and/or classifications of entities to associate entity types.

8. The method as claimed in claim 1, wherein associating generated entity types to other entity types includes relating types and/or determining subtypes and parent-types.

9. The method as claimed in claim 1, including optimizing the semantic network to output the resultant ontology including creating a map of common and unique properties with classifications across entity types and/or providing additional classifications for entity types.

10. The method as claimed in claim 1, including enabling user review and input during stages of generation of the ontology, including one or more stages of: reading the selected logical groupings of data, detecting classifications of data attributes, generating entity types, associating entity types, and output of the resultant ontology.

11. The method as claimed in claim 1, wherein the method is provided as a service in a cloud environment.

12. A system for automatic ontology generation for consolidating and storing a set of data from a plurality of different data sources, comprising:
a processor and a memory configured to provide components comprising computer program instructions to the processor to execute functions of the components, wherein the components comprising computer program instructions include:
a seed component for providing a semantic network of concepts as an ontology template for a target domain of knowledge with the concepts defined as base entity types;
a source reading component for selecting from the plurality of different data sources a subset of logical groupings of data based on a number of foreign key references to data within the plurality of different data sources and for reading the selected logical groupings of data and associated technical metadata from the plurality of different data sources;
a data classification component for applying data discovery techniques to detect semantic and/or syntactic classification of data attributes in the selected logical groupings of data, wherein the data discovery techniques include:
identifying formats of known concepts within the selected logical groupings of data to detect the semantic and/or syntactic classification of the data attributes indicating a corresponding concept; and
validating the detected classification of the data attributes based on a quantity of values in the selected logical groupings of data satisfying constraints of the detected classification of the data attributes;
an entity type component, for each of the selected logical groupings of data, generating an entity type with properties for the data attributes and adding the generated entity type to the semantic network with classifications of the properties as derived from the applied data discovery techniques;
an entity associating component detecting semantic meanings of the generated entity types and associating the generated entity types to other entity types within the semantic network; and
an ontology output component for outputting the semantic network as a resultant ontology for the set of data and for extracting the set of data from the plurality of different data sources and storing the extracted data in a centralized repository in accordance with the resultant ontology.

13. The system as claimed in claim 12, wherein the seed component provides the base entity types with properties based on attributes and a set of classifications of the properties, and wherein the classifications detected by the data classification component are classifications of the base entity types.

14. The system as claimed in claim 12, wherein the entity type component for generating an entity type with properties for the data attributes includes a naming component using names for the generated entity type and properties from the associated technical metadata.

15. The system as claimed in claim 12, wherein the components comprising computer program instructions further include an entity metadata linking component that provides a generated entity type with stored lineage to the data source from which the generated entity type originates by linking to technical metadata of the data source.

16. The system as claimed in claim 12, wherein the data classification component includes a probability component for providing a probability of correct classification based on a compliance with constraints of a classification.

17. The system as claimed in claim 12, wherein the entity associating component uses common properties and/or classifications of entities to associate entity types and wherein the associating relates types and/or determines subtypes and parent-types.

18. The system as claimed in claim 12, wherein the components comprising computer program instructions further include an optimization component for optimizing the semantic network to output the resultant ontology including creating a map of common and unique properties with classifications across entity types and/or providing additional classifications for entity types.

19. The system as claimed in claim 12, including a user interface for enabling user review and input during stages of generation of the ontology, including one or more stages of: reading the selected logical groupings of data, detecting classifications of data attributes, generating entity types, associating entity types, and output of the resultant ontology.

20. A computer program product for automatic ontology generation for consolidating and storing a set of data from a plurality of different data sources, the computer program product comprising a computer readable storage medium having program instructions embodied therewith, the program instructions executable by a processor to cause the processor to:
provide a semantic network of concepts as an ontology template for a target domain of knowledge with the concepts defined as base entity types;
select from the plurality of different data sources a subset of logical groupings of data based on a number of foreign key references to data within the plurality of different data sources;
read the selected logical groupings of data and associated technical metadata from the plurality of different data sources;
apply data discovery techniques to detect semantic and/or syntactic classification of data attributes in the selected logical groupings of data, wherein the data discovery techniques include:
identifying formats of known concepts within the selected logical groupings of data to detect the semantic and/or syntactic classification of the data attributes indicating a corresponding concept; and
validating the detected classification of the data attributes based on a quantity of values in the selected logical groupings of data satisfying constraints of the detected classification of the data attributes;

for each of the selected logical groupings of data, generate an entity type with properties for the data attributes and add the generated entity type to the semantic network with classifications of the properties as derived from the applied data discovery techniques;

detect semantic meanings of the generated entity types and associate the generated entity types to other entity types within the semantic network;

output the semantic network as a resultant ontology for the set of data; and extract the set of data from the plurality of different data sources and store the extracted data in a centralized repository in accordance with the resultant ontology.

21. The computer program product as claimed in claim 20, wherein providing a semantic network of concepts as an ontology template includes providing the base entity types with properties based on attributes and a set of classifications of the properties, and wherein the classifications detected by applying data discovery techniques are classifications of the base entity types.

* * * * *